United States Patent [19]

Namiki

[11] Patent Number: 4,498,885
[45] Date of Patent: Feb. 12, 1985

[54] SPACE DIVERSITY SYSTEM
[75] Inventor: Junji Namiki, Tokyo, Japan
[73] Assignee: NEC Corporation, Tokyo, Japan
[21] Appl. No.: 512,649
[22] Filed: Jul. 11, 1983
[30] Foreign Application Priority Data Jul. 14, 1982 [JP] Japan .................. 57-122716

[51] Int. Cl.³ .............................. H04B 7/08
[52] U.S. Cl. .................... 455/273; 455/139; 455/276; 455/278; 375/100
[58] Field of Search ............. 455/52, 65, 138, 139, 455/273, 276, 278, 296; 375/40, 100, 101

[56] References Cited

U.S. PATENT DOCUMENTS

| 4,326,294 | 4/1982 | Okamoto et al. | 455/273 |
| 4,373,210 | 2/1983 | Karabinis et al. | 455/273 |
| 4,384,366 | 5/1983 | Kaitsuka | 455/139 |

FOREIGN PATENT DOCUMENTS 92931 6/1982 Japan .................. 455/273

Primary Examiner—Jin F. Ng
Attorney, Agent, or Firm—Laff, Whitesel, Conte & Saret

[57] ABSTRACT

A space diversity system for transmitting digital microwaves is disclosed. Each of two antennas receives a direct wave and an interference wave. The output phase of one of the two antennas is controlled to combine an output thereof with that of the other antenna, so that the interference waves cancel each other and a vector sum of the direct waves is produced as a combined output. Even if the two antenna inputs are so much alike, the combined output level and thereby the signal-to-noise ratio is prevented from being lowered whereby error in identification is eliminated.

4 Claims, 6 Drawing Figures

SPACE DIVERSITY SYSTEM

BACKGROUND OF THE INVENTION

The present invention relates to a space diversity system for the transmission of digital microwaves.

In space diversity systems heretofore proposed, composite outputs are provided either by a method relying on inphase combination or a method relying on switching. Of the two known methods, the former is predominant today because the latter is unsuitable for digital transmission systems due to a phase difference between two antenna outputs which would cause switching to bring discontinuity into phases.

Recently, high capacity digital transmission with high stability as typified by 16 QAM (Quadrature Amplitude Modulation) has been put to practical use. In parallel with this trend, the role initially assigned to the space diversity system for insuring receive signal levels is being replaced by a new role for removing interference waves, which would creat distortions in direct waves. The interference cancellation type space diversity system implements the demand for the new role. A radio receiving apparatus using such a system is disclosed in U.S. Pat. No. 4,326,294 issued Apr. 20, 1982. A drawback inherent in this prior art apparatus is that, where two antenna inputs are quite similar to each other, the combined signal level becomes far lower than the noise level tending to bring about an error in identification.

SUMMARY OF THE INVENTION

It is therefore an object of the present invention to provide a space diversity system which achieves far better characteristics than the conventional by overcoming the occurrence that the combined output level becomes lower to deteriorate the signal-to-noise ratio when two antenna inputs resemble each other.

It is another object of the present invention to provide a generally improved sapce diversity system.

A space diversity system of the present invention is of the type wherein a first antenna receives a first direct wave and a first interference wave and a second antenna receives a second direct wave and a second interference wave. An output phase of the second antenna is controlled to combine an output thereof with an output of the first antenna so that the first and second interference waves cancel each other and a vector sum of the first and second direct waves is provided as a combined output. The system comprises a variable phase shifter for controlling the output phase of the second antenna, a demodulator for receiving the combined output of the two antennas, an identification circuit for identifying a digital signal output from the demodulator, an error detector for detecting a magnitude of a difference between an input signal and an output signal of the identification circuit, an oscillator for oscillating a signal having a short period, a correlation circuit for determining a correlation between an output of the oscillator and an output of the error detector, either an integrator for integrating an output of the correlation circuit or a low-pass filter for smoothing the output of the correlation circuit, and means for controlling the phase shifter in such a manner as to minimize the output of the error detector by adding either an output of the integrator or an output of the low-pass filter to an output of the oscillator and supplying the sum to the phase shifter as a control signal.

The above and other objects, features and advantages of the present invention will become apparent from the following detailed description taken with the accompanying drawings.

DESCRIPTION OF THE PREFERRED EMBODIMENT

While the space diversity system of the present invention is susceptible of numerous physical embodiment, depending upon the environment and requirements of use, a substantial number of the herein shown and described embodiment have been made, tested and used, and all have performed in an eminently satisfactory manner.

Figure 1:
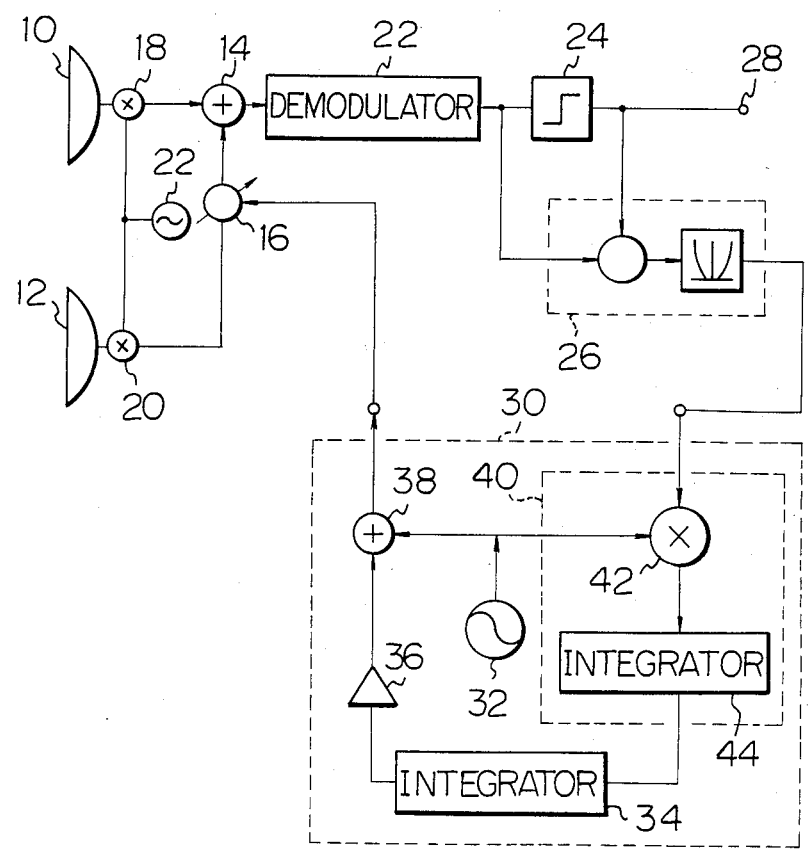
FIG. 1 is a circuit diagram of a space diversity system embodying the present invention.
Figure 2:
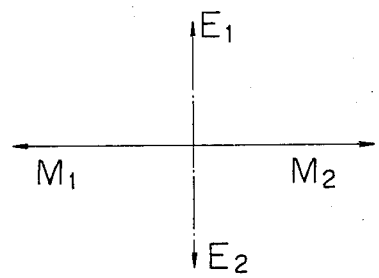
FIGS. 2-3 are signal vector diagrams demonstrating the operation of the system shown in FIG. 1.
Figure 3:
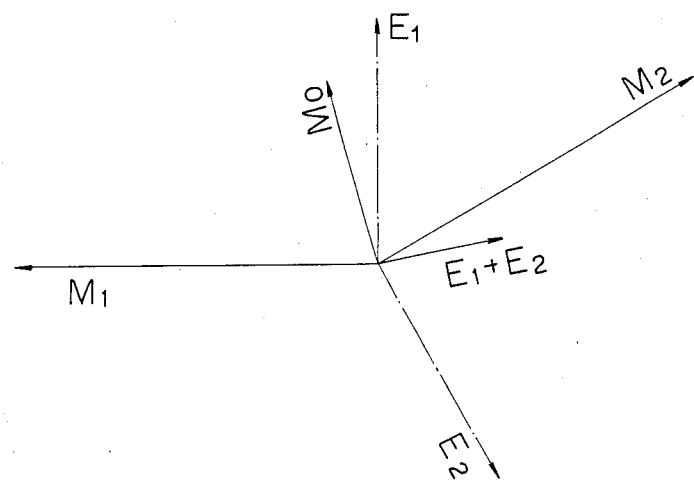

Referring to FIG. 1 of the drawings, the space diversity system includes antennas 10 and 12, a combining circuit 14, a variable phase shifter 16, mixers 18 and 20, and an oscillator which are common in construction to those described in the previously mentioned U.S. Pat. No. 4,326,294. A demodulator 22 demodulates a signal prepared by combining outputs of the antennas 10 and 12. The digital output of the demodulator 22 is fed to an identification circuit 24 as well as to an error detector 26. While the identification circuit 24 identifies the digital signal, the error detector 26 determines the absolute value of an error or difference e between the input and the output of the identification circuit 24. The output $|e|$ of the error detector 26 increases with an increase in interference wave and with an increase in noise. Therefore, where two input signals are different in phase by 180 degrees from each other as shown in FIG. 2, the error detector output $|e|$ grows extremely large due to an increase in noise. In this instance, it is possible to increase the combined signal level beyond the interference wave and thereby cut down the influence of noise by controlling the phase shifter 16 with the output of the error detector 26 in such a manner as to accommodate some interference wave, as shown in FIG. 3. The regular identified output of the demodulator 22 appears at a terminal 28. The output of the demodulator 22 is a baseband signal identical with a signal which was sent out from a transmitter. Concerning the 4-phase shift keying (PSK) system, for example, four signals $(1+j)$, $(1-j)$, $(-1+j)$ and $(-1-j)$ will be produced from the demodulator 22. If noise is superposed on the input signal, the noise will of course be output from the demodulator 22 together with the signal.

Where the phase control on the variable phase shifter 16 is performed in a direction for minimizing the output of the error detector 26 as described above, desirable controls will occur for all the signal input conditions at the antennas 10 and 12.

The control section 30 will be described hereinafter. Suppose that an interference wave $E_2$ at the antenna 12 has a phase which is deviated $\phi e$ (rad) from a value giving $E_1 + E_2 = 0$, as illustrated in FIG. 3. What is required here is to condition the phase shift $\phi s$ of the phase shifter 16 as:

$$\phi s = -\phi e$$

Initially, the phase shift $\phi s$ is not optimized and, therefore, includes a deviation $\epsilon d$ (rad) as expressed by $$\phi s = -\phi e + \epsilon d.$$

When perturbation $\epsilon_0 \cdot \sin \omega_0 t$ is given to the phase shift $\phi s$ (where $\epsilon_0 > 0$), $$\phi s = -\phi e + \epsilon d + \epsilon_0 \cdot \sin \omega_0 t.$$

Thus, based on the perturbation $\epsilon_0 \cdot \sin \omega_0 t$, the absolute value $|e|$ of the intersymbol interference undergoes a variation as produced by $$|e| \simeq |e_0| + \beta \cdot \epsilon d \cdot \sin \omega_0 t$$

where $|e_0|$ and $\beta$ are given constants. ($\beta > 0$).

The correlation R between the absolute value $|e|$ and the perturbation signal $\epsilon_0 \cdot \sin \omega_0 t$ is expressed as $$R = \frac{1}{2\tau_0} \int_{-\tau_0}^{\tau_0} |e| \cdot \epsilon_0 \cdot \sin\omega_0 t \cdot dt$$

$$= \frac{0}{2\tau_0} \int_{-\tau_0}^{\tau_0} (|e| + \beta \epsilon d \cdot \sin\omega_0 t) \cdot \sin\omega_0 t \cdot dt$$

$$= \epsilon_0 \cdot \pi \cdot \beta \cdot \epsilon d$$

Because $\epsilon_0 \cdot \beta$ is positive in sign, it will be seen from the above equation that the correlation R is common in sign to $\epsilon d$. This in turn teaches that the control over the phase shift $\phi s$ needs only be such that it increases or and decreases in the opposite direction to the polarity of the correlation R. It should be noted that the sinusoidal change due to the perturbation proceeds faster than a change derived from the control according to the polarity of the correlation R and, in the average sense, it is zero, the perturbation in effect making no contribution to the essential value of the phase shift $\phi s$. Accordingly, $$\frac{a\phi s}{t} = -(\text{small coefficient}) \cdot R$$

Further, $$\phi s = -\alpha \int R dt = -\alpha \int \frac{1}{2\tau_0} \int |e| \cdot \epsilon_0 \cdot \sin\omega_0 t \cdot dt dt$$

Because the integration for obtaining the correlation R is usable for the control integration purpose as well, it will suffice to control the phase shift $\phi s$ as produced by $$\phi s = -\alpha \int |e| \cdot \epsilon_0 \cdot \sin \omega_0 t \cdot dt.$$

The principle of operation of the control section 30 will be understood from the above description. As shown in FIG. 1, the control section 30 comprises an oscillator 32 for generating the perturbation $\epsilon_0 \cdot \sin \omega_0 t$, an integrator 34 for control, and a polarity reversing circuit 36. An adder 38 functions to add a perturbance signal to a control signal for a voltage controlled oscillator. A correlation circuit 40 comprises a multiplier 42 and an integrator 44 and serves to determine a correlation R between the perturbance signal and the output of the error detector 26. The integrator 44, however, does not constitute any essential part of the circuit and may be omitted, if desired. The output of the adder 38 is the control signal for controlling the phase of the phase shifter 16.

In summary, it will be seen that the present invention provides a space diversity system which minimizes identification errors by controlling the variable phase shifter 16 by means of the error detector 26.

Figure 4:
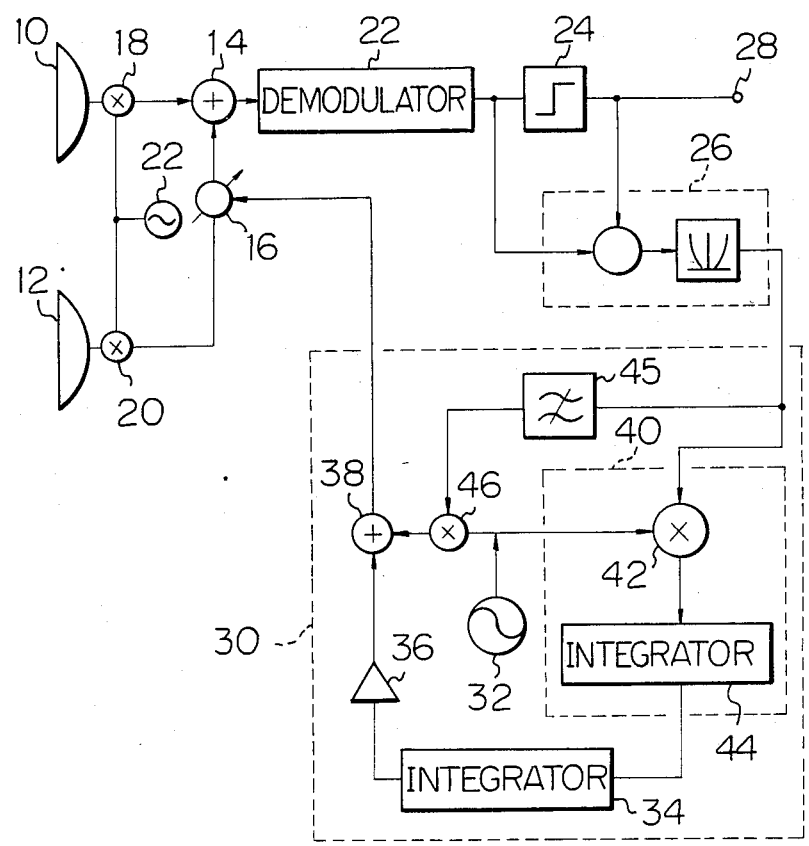
FIG. 4 is a modification of the space diversity system shown in FIG. 1.

FIG. 4 shows a modified space diversity system shown in FIG. 1 where the perturbation amplitude $\epsilon_0$ in the perturbation $\epsilon_0 \cdot \sin \omega_0 t$ is controlled according to the output level of the error detector 26. If the output level of the error detector 26 is large, the perturbation amplitude $\epsilon_0$ is set large so as to detect the correlation R easily. On the other hand, if it is an inverse case, the $\epsilon_0$ is set small so that this perturbation may not generate a large signal output jitter.

This function is performed by a combination of a lowpass filter 45 and a multiplier 46. The lowpass filter 45 smooths the output of the error detector 26 and makes the output proportional to the error level. The multiplier 46 modifies the oscillator output according to the output of the lowpass filter 45.

Figure 5:
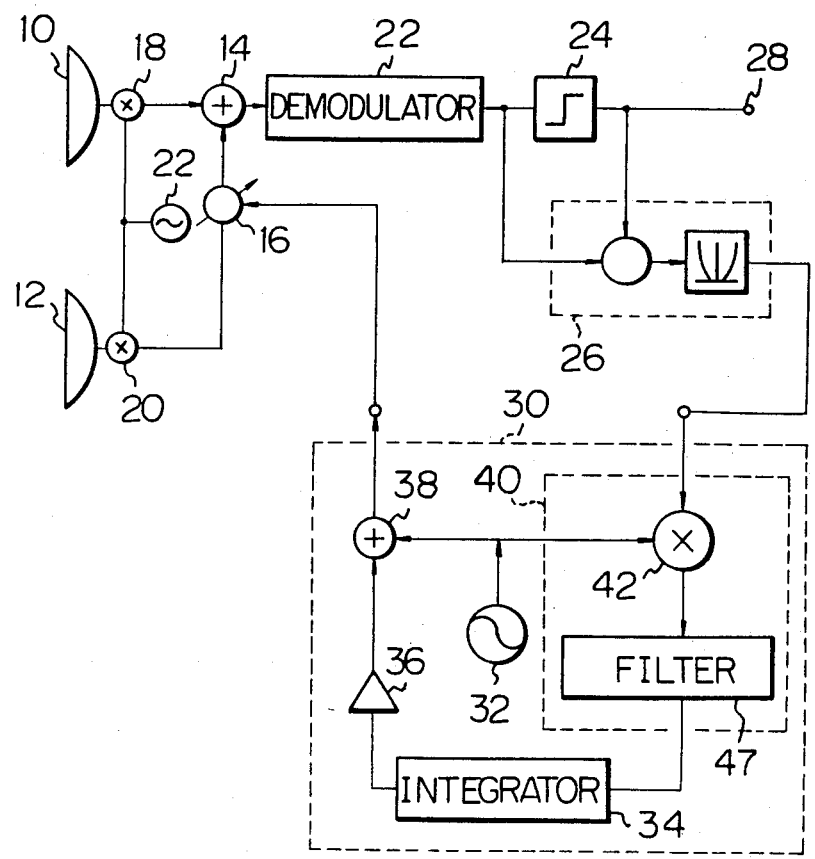
FIGS. 5 and 6 are modifications to the space diversity systems shown in FIGS. 1 and 4, respectively.
Figure 6:
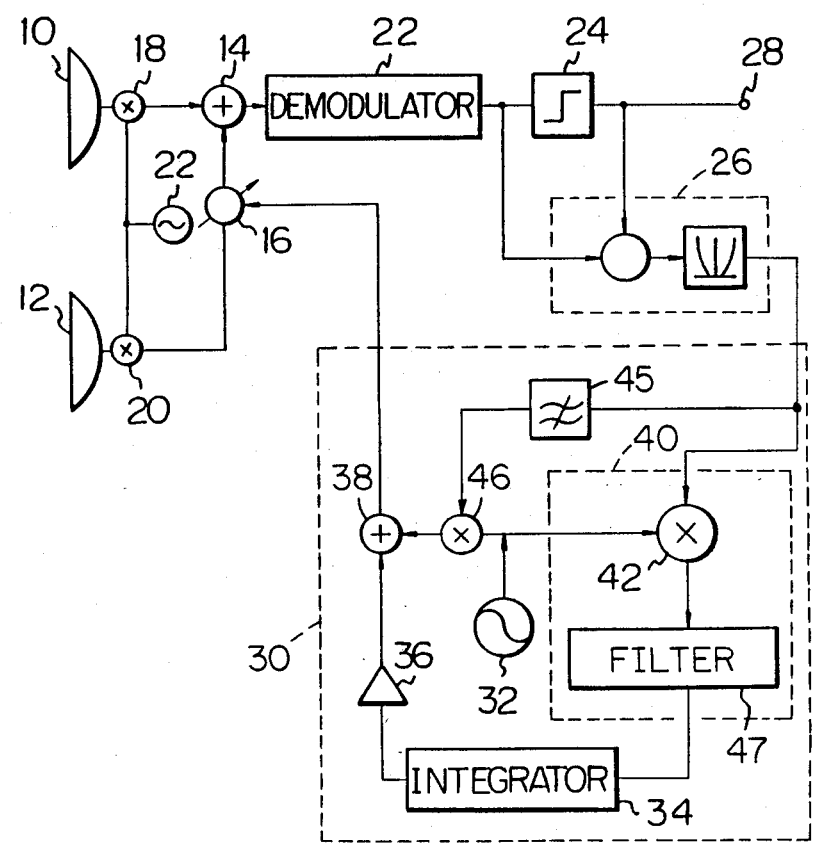

FIGS. 5 and 6 show other modifications of the present invention which commonly include, in place of the integrator 44 of the system of FIGS. 1 or 4, a low-pass filter 47 adapted to smooth an output of the multiplier 42 which serves to provide correlation. Each of these alternative modifications, like the embodiment of FIGS. 1 or 4, is successful to reduce identification error.

Various modification will become possible for those skilled in the art after receiving the teachings of the present disclosure without departing from the scope thereof.

What is claimed is:

1. A space diversity system in which a first antenna receives a first direct wave and a first interference wave and a second antenna receives a second direct wave and a second interference wave, the system controlling an output phase of the second antenna to combine an output thereof with an output of the first antenna so that the first and second interference waves cancel each other and a vector sum of the first and second direct waves is provided as a combined output, said system comprising:

a variable phase shifter for controlling the output phase of the second antenna;

a demodulator for receiving the combined output of the two antennas;

an identification circuit for identifying a digital signal output from said demodulator;

an error detector for detecting a magnitude of a difference between an input signal and an output signal of said identification circuit;

an oscillator for oscillating a signal having a short period;

a correlation circuit for determining a correlation between an output of said oscillator and an output of the error detector;

an integrator for integrating an output of said correlation circuit; and means for controlling the phase shifter in such a manner as to minimize the output of the error detector by adding an output of the integrator and an output of the oscillator and supplying the sum to the phase shifter as a control signal.

2. A space diversity system in which a first antenna receives a first direct wave and a first interference wave and a second antenna receives a second direct wave and a second interference wave, the system controlling an output phase of the second antenna to combine an output thereof with an output of the first antenna so that the first and second interference waves cancel each other and a vector sum of the first and second direct waves is provided as a combined output, said system comprising:
- a variable phase shifter for controlling the output of the two antennas;
- a demodulator for receiving the combined output of the two antennas;
- an identification circuit for identifying a digital signal output from said demodulator;
- an error detector for detecting a magnitude of a difference between an input signal and an output signal of said identification circuit;
- a lowpass filter for smoothing an output of said error detector;
- an oscillator for oscillating a signal having a short period;
- a multiplier for multiplying an output of said first lowpass filter with the output of said oscillation;
- a correlation circuit for determining a correlation between an output of said oscillator and an output of the error detector;
- an integrator for integrating an output of said correlation circuit; and
- means for controlling the phase shifter in such a manner as to minimize the output of the error detector by adding an output of the integrator and an output of the multiplier and supplying the sum to the phase shifter as a control signal.

3. A space diversity system in which a first antenna receives a first direct wave and a first interference wave and a second antenna receives a second direct wave and a second interference wave, the system controlling an output phase of the second antenna to combine an output thereof with an output of the first antenna so that the first and second interference waves cancel each other and a vector sum of the first and second direct waves is provided as a combined output, said system comprising:
- a variable phase shifter for controlling the output phase of the second antenna;
- a demodulator for receiving the combined output of the two antennas;
- an identification circuit for identifying a digital signal output from said demodulator;
- an error detector for detecting a magnitude of a difference between an input signal and an output signal of said identification circuit;
- an oscillator for oscillating a signal having a short period;
- a correlation circuit for determining a correlation between an output of said oscillator and an output of the error detector;
- a low-pass filter for smoothing the output of the correlation circuit; and
- means for controlling the phase shifter in such a manner as to minimize the output of the error detector by adding an output of the low-pass filter to an output of the oscillator and for supplying the sum to the phase shifter as a control signal.

4. A space diversity system in which a first antenna receives a first direct wave and a first interference wave and a second antenna receives a second direct wave and a second interference wave, the system controlling an output phase of the second antenna to combine an output thereof with an output of the first antenna so that the first and second interference waves cancel each other and a vector sum of the first and second direct waves is provided as a combined output, said system comprising:
- a variable phase shifter for controlling the output of the two antennas;
- a demodulator for receiving the combined output of the two antennas;
- an identification circuit for identifying a digital signal output from said demodulator;
- an error detector for detecting a magnitude of a difference between an input signal and an output signal of said identification circuit;
- a first lowpass filter for smoothing an output of said error detector;
- an oscillator for oscillating a signal having a short period;
- a multiplier for multiplying an output of said first lowpass filter with the output of said oscillation;
- a correlation circuit for determining a correlation between an output of said oscillator and an output of the error detector;
- a second lowpass filter for smoothing the output of the correlation circuit; and
- means for controlling the phase shifter in such a manner as to minimize the output of the error detector by adding an output of the second lowpass filter to an output of the multiplier and for supplying the sum to the phase shifter as a control signal.

* * * * *